United States Patent Office 3,057,884
Patented Oct. 9, 1962

3,057,884
PROCESS FOR CONVERTING 11-HYDROXY STEROID COMPOUNDS TO CORRESPONDING KETO DERIVATIVES
Bradford H. Walker and Ingemar B. Forsblad, Kalamazoo Township, Kalamazoo County, Mich., assignors to The Upjohn Company, Kalamazoo, Mich., a corporation of Delaware
No Drawing. Filed July 24, 1961, Ser. No. 125,989
19 Claims. (Cl. 260—397.3)

This invention relates to an improved process for preparing ketosteroid compounds. More particularly, it relates to an improved process for converting certain 11-hydroxy and 11,20-dihydroxy steroid compounds to the corresponding mono- and di-keto-steroid compounds by means of modified chromic acid oxidation procedures in accordance with the conditions to be described in detail hereinafter.

Compounds having secondary hydroxy groups at the 11 and 11,20-positions which can be oxidized to the corresponding 11-keto and 11,20-diketo compounds, respectively, in accordance with the improved process of this invention include those represented by the following sequences of formulae designated as groups A, B and C below.

GROUP A

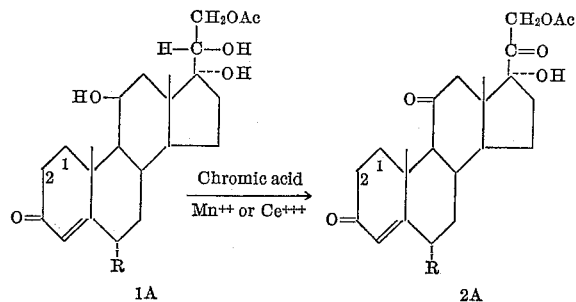

GROUP B

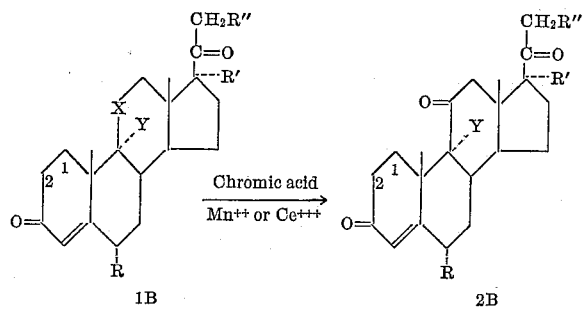

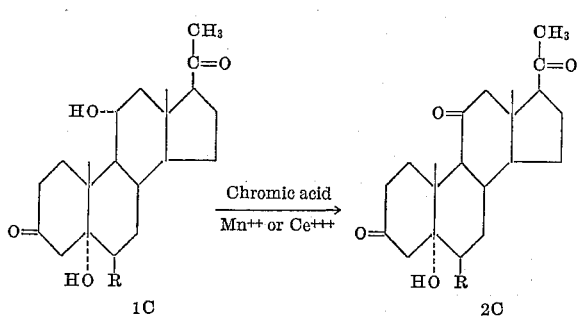

wherein Ac is the acyl radical of an organic carboxylic acid, R is hydrogen, methyl, bromine, chlorine, or fluorine. R' is hydrogen or hydroxy; R" is hydrogen or OAc, in which Ac is defined as above; X is the α-hydroxymethylene radical or the β-hydroxymethylene radical; Y is hydrogen, bromine, chlorine or fluorine and the 1,2-carbon atom linkage is a single bond linkage or a double bond linkage.

The following are typical of the oxidations represented by the above formulae:

11β,17α,20α,21-tetrahydroxy-4-pregnen-3-one 21-acetate to cortisone acetate,
6α-methyl-11β,17α,20α,21-tetrahydroxy-4-pregnene-3-one 21-acetate to 6α-methylcortisone acetate,
6α-fluoro-11β,17α,20α,21-tetrahydroxy-4-pregnen-3-one 21-acetate to 6α-fluorocortisone acetate,
11β,17α,20α,21-tetrahydroxy-1,4-pregnadien-3-one 21-acetate to prednisone acetate,
6α-methyl-11β,17α,20α,21-tetrahydroxy-1,4-pregnadien-3-one 21-acetate to 6α-methylprednisone acetate,
6α-fluoro-11β,17α,20α,21-tetrahydroxy-1,4-pregnadien-3-one 21-acetate to 6α-fluoroprednisone acetate,
11α-hydroxyprogesterone to 11-ketoprogesterone,
11β-hydroxyprogesterone to 11-ketoprogesterone,
11α,17α-dihydroxyprogesterone to 11-keto-17α-hydroxyprogesterone,
6α-methyl-11α-hydroxyprogesterone to 6α-methyl-11-ketoprogesterone,
6α-fluoro-11β-hydroxyprogesterone to 6α-fluoro-11-ketoprogesterone,
hydrocortisone acetate to cortisone acetate,
9α-fluorohydrocortisone acetate to 9α-fluorocortisone acetate,
6α-methylhydrocortisone acetate to 6α-methylcortisone acetate,
6α-fluorohydrocortisone acetate to 6α-fluorocortisone acetate,
prednisolone acetate to prednisone acetate,
6α-methylprednisolone acetate to 6α-methylprednisone acetate,
6α-fluoroprednisolone acetate to 6α-fluoroprednisone acetate,
5α,11α-dihydroxy-6β-methylpregnane-3,20-dione to 5α-hydroxy-6β-methyl-pregnane-3,11,20-trione,
5α,11β-dihydroxy-6β-fluoro-pregnane-3,20-dione to 5α-hydroxy-6β-fluoropregnane-3,11,20-trione, etc.

Heretofore, unmodified chromic acid oxidations of certain steroidal secondary hydroxy groups have presented serious production problems resulting from cleavage of adjacent carbon-to-carbon bonds, thereby, giving low yields and poor quality of the desired ketosteroid. Carbon-to-carbon cleavage is especially pronounced in the oxidation of 11,20-dihydroxy groups of steroids wherein unmodified chromic acid oxidations result in side chain cleavage at the 17,20-carbon-to-carbon bond giving large quantities of impurities and proportionally lower yields of the desired ketosteroid. In many instances, the production of 11,20-diketosteroids from 11,20-dihydroxy-steroids is economically unfeasible due to the poor yields and to the extreme difficulties and the costly methods required for recovery and purification of the product from the reaction medium. For example, in the unmodified chromic acid oxidation of 11β,17α,20α,21-tetrahydroxy-4-pregnen-3-one 21-acetate, low and inconsistent yields of cortisone acetate ranging from a low of about 4% to a high of about 30% are obtained together with large quantities of undesirable by-products. These by-products consist mainly of adrenosterone which is produced by oxidation at the 11-position and cleavage of the 17,20-bond, and 17α,20α,21-trihydroxy-4-pregnene-3,11-dione 21-acetate which is produced by partial oxidation of the starting material, i.e., oxidation at the 11-position only. Recovery of the cortisone acetate from the reaction medium and purification of the product can be accomplished only by expensive and difficult procedures such as chromatography, solvent extractions, fractional crystallization and the like.

In the unmodified chromic acid oxidations of steroidal 11-hydroxy groups, some cleavage takes place at the 9,11-carbon-to-carbon linkage giving proportionally lower yields of the desired 11-ketosteroid for example in the oxidation of hydrocortisone acetate to cortisone acetate, 11α-hydroxyprogesterone to 11-ketoprogesterone, etc.

It has now been discovered that secondary hydroxy groups at the 11-position and the 11,20-positions of steroids can be converted to the corresponding 11-keto and 11,20-diketo compounds, respectively, in increased yield and improved quality by chromic acid oxidation, modified by the presence of manganous or cerous ions in the reaction medium, thereby preventing or greatly reducing the cleavage reactions which normally take place in unmodified chromic acid oxidations.

In the oxidation of steroids containing secondary hydroxy groups at the 11,20-positions to produce the corresponding 11,20-diketosteroids, the improved process of this invention has the following advantages over the art:

(1) Substantial increases in yields, (2) the product is easily separated from the reaction medium in high purity by conventional and economical methods which are readily adaptable to large scale operations. For example, in the oxidation of 11β,17α,20α,21-tetrahydroxy-4-pregnen-3-one 21-acetate to cortisone acetate by the improved process of this invention, the product is easily recovered from the reaction medium by the addition of water, thereby precipitating high quality cortisone acetate in yields of 50%–60%. The cortisone acetate thus obtained can be further purified if desired by recrystallization from a suitable solvent or mixture of solvents to give an overall yield of 40–45%. Additional product can be recovered from the crystallization liquors.

The improved process of this invention is also advantageous over the art in the oxidation of the 11-hydroxy group of 20-keto steroids. The improved process of this invention gives: (1) improved yields and higher quality of the desired final product and (2) substantially reduced labor requirements resulting from ease in recovery of the product from the reaction medium, e.g., precipitation by the addition of water to the reaction mixture. For example, the improved process of this invention when applied to the 11-hydroxy compounds listed below gave substantial increases in yield over the known prior art processes as shown in the following table:

| Starting material | Product | Percent increase |
|---|---|---|
| (1) 11α-hydroxyprogesterone to | 11-ketoprogesterone | 5–6 |
| (2) hydrocortisone acetate to | cortisone acetate | 10 |
| (3) 5α,11β-dihydroxy-6β-methylpregnane-3,20-dione to | 5α - hydroxy - 6β-methylpregnane - 3, 11,20 - trione | 2–5 |

The general oxidation procedures carried out in accordance with the process of this invention are known in the art [textbook "Steroids," Fieser and Fieser, pages 606–607 (Reinhold, 1959)], and the improved process of this invention comprises the addition of manganous or cerous salts to the reaction medium.

In carrying out the improved process of this invention, the selected 11-hydroxy or 11,20-dihydroxy compound represented by Formulae 1A, 1B or 1C, above is dissolved or suspended in a suitable solvent such as acetic acid, propionic acid, acetone, substituted amides, acetonitrile, tertiary alcohols, dialkyl ketones, e.g., methyl ethyl ketone, and the like. Acetic acid is the preferred solvent.

The chromic acid employed as oxidizing agent in the process of this invention comprises an aqueous solution of chromic acid. This aqueous oxidizing medium can be prepared in a variety of ways, such as by dissolving chromium trioxide in water and adding sulfuric acid to the resulting solution. Alkali metal dichromates and chromates, such as sodium dichromate dihydrate, sodium chromate, or potassium chromate, can be used instead of chromium trioxide. Likewise, other mineral acids such as phosphoric acid, or sulfonic acids such as methane-sulfonic acid, can be used instead of sulfuric acid, the function of the particular acid used merely being to furnish hydrogen ions in the oxidizing medium.

Stoichiometrically, the molar ratio of 11,20-dihydroxy compounds to chromic acid is 1:1.34 and the molar ratio of 11-hydroxy compounds to chromic acid is 1:0.67, it being understood that 2 moles of chromium trioxide are equivalent to 3 atoms of oxygen. Although the process of this invention can be carried out using stoichiometric amounts of reactants, it is preferred that the chromic acid be employed in excess.

The manganous or cerous ions are introduced into the reaction medium by adding the desired amount of the selected salt. Salts which are water soluble are generally preferred, such as, for example, manganous nitrate, manganous sulfate, manganous chloride, manganous acetate, manganous benzoate, cerous sulfate, cerous nitrate, cerous acetate, cerous chloride, cerous silica fluoride, cerous formate and the like. The selected salt can be added in solid form or preferably in an aqueous solution. The concentration of manganous or cerous ions in the reaction medium can range from a trace to about 5 moles per mole of starting steroid. The improved process of this invention is operative using greater amounts of manganous or cerous ions, however, greater quantities only add to the cost of the process without producing substantial improvements in the oxidation over the results obtained using the prescribed range.

In the chromic acid oxidation of the 11,20-dihydroxy groups of the compounds of Formula 1A, the presence of manganous or cerous ions within the range of from about 0.06 mole to about 4.0 moles per mole of starting steroid is generally preferred. In the oxidation of the compounds of Formula 1A, wherein the 1,2-carbon atom linkage is a single bond linkage, concentrations of manganous or cerous ions within the range of from about 0.6 mole to about 3.0 moles per mole of starting steroid are particularly advantageous. In the oxidation of the compounds of Formula 1A, wherein the 1,2-carbon atom linkage is a double bond linkage, concentrations of manganous or cerous ions within the range of from about 0.06 mole to about 4.0 moles per mole of starting steroid are particularly advantageous.

In the chromic acid oxidation of the 11-hydroxy groups of the compounds of Formulae 1B and 1C, concentrations of manganous or cerous ions within the range of from about 0.1 millimole to about 2 moles per mole of starting steroid are generally preferred with the range of from about 15 millimoles to about 0.4 mole being particularly advantageous.

The presence of water in the reaction medium during the oxidation is desirable in order to keep the manganous or cerous salts in solution and to keep the chromium salts, which are formed during the reaction, from crystallizing with the steroid.

The process of the invention is carried out by bringing the aqueous solution of chromic acid and the hydroxy compound into contact with each other in the presence of manganous or cerous ions, the selected 11-hydroxy or 11,20-dihydroxy compound being present in a solvent medium containing the selected manganous or cerous salt or the manganous or cerous salt can be added to the chromic acid solution and the mixture added to the steroid. It is preferred to add the chromic acid to the steroid, although the mode of addition can be varied within the scope of this invention, for example, the selected starting material can be added to a mixture of the remaining ingredients, i.e., chromic acid, the selected manganous or cerous salt and the selected solvent or solvents; or the strong acid can be added to a mixture of the remaining ingredients, i.e., chromium trioxide or other chromate salt, e.g., those listed above, the selected manganous or cerous salt, the selected starting material and the selected solvent.

The reaction is preferably carried out under conditions of continual stirring or other agitation. The reaction, which is exothermic, is carried out below about 75° C., the temperature range of from about 0° C. to about 60° C. being preferred, with about 10° C. to about 40° C. being a particularly satisfactory temperature range. The chromic acid can be added continuously or portionwise over a short period of time. In some instances the time can be as little as 4 or 5 minutes, or even less, particularly when employing the higher reaction temperatures and/or when operating on a small scale. In other instances it may be desirable to add the chromic acid over a longer period of time, such as up to 1 to 2 hours, or even somewhat greater, particularly when applying the lower reaction temperatures and/or when operating on a large scale. At times the heat of reaction will be sufficient to maintain the reaction mixture within the desired temperature range, while at other times external heating or cooling may be required, as will be obvious to the skilled operator. When converting the selected hydroxy compound to the corresponding keto compound in accordance with this invention, many variations are possible, such as the particular hydroxy compound being oxidized, the particular solvent employed as reaction medium, the amount of water which may be present, the weight ratio of hydroxy compound to solvent, the concentration of the aqueous solution of chromic acid, the molar ratio of hydroxy compound to chromic acid, the concentration of manganous or cerous ions, the scale on which the reaction is being carried out, etc. Accordingly, it will be understood that optimum reaction time and temperature will depend upon prevailing conditions, so that the selection of time and temperature to be employed for the oxidation is a matter of choice and judgment within the skill of the chemist. In any event, it is preferred that the reaction temperature be as low as is consistent with a reasonable rate of reaction, and that the reaction time be as short as is consistent with carrying the reaction substantially to completion.

After all the chromic acid has been added, it is desirable although not essential to continue agitation of the reaction mixture for a short time, such as 5 to 30 minutes, in order to insure completion of reaction. The desired keto product can be isolated in excellent yield and purity from the reaction mixture, merely by the use of simple techniques. An excellent technique wherein the product is obtained as a single crop consists of adding water or dilute sodium or potassium hydroxide solution to the reaction mixture, adjusting the temperature of the resulting mixture to about 0° to 20° C., separating the solid keto compound, such as by filtration or centrifugation, and washing the keto compound with water in order to remove water-soluble contaminants such as acids, chromium salts, manganous or cerous salts, etc., and drying, if so desired. Ordinarily, the purity of the keto product obtained is highly satisfactory, and the product can be used without further purification for various purposes, such as an intermediate for further chemical processing.

If desired, the product can be further purified by recrystallization from a suitable solvent or mixture of solvents, e.g., acetone-water.

The following examples are illustrative of the present invention but are not to be construed as limiting.

*Example 1.—Cortisone Acetate*

A mixture was prepared consisting of 10 g. of $11\beta,17\alpha,20\alpha,21$-tetrahydroxy-4-pregnen-3-one 21-acetate, 90 ml. of glacial acetic acid, 10 ml. of water and 20 ml. of a 50% aqueous solution of manganous nitrate (500 g. manganous nitrate/liter). The temperature of this mixture was fixed at 10° C. and to it was added a solution of 10.688 gm. chromium trioxide in 30.4 ml. deionized water. The exothermic reaction was held below 30° C. by external cooling. The reaction mixture was then cooled to 10° C., after which 6 ml. of concentrated sulfuric acid was added. The system was maintained at 30° C. by external cooling for 8 minutes following the acid addition and then 400 ml. of deionized water was added over a 10 minute period. The slurry thus obtained was cooled to 10° C., filtered, washed clean of color with about 600 ml. of deionized water and dried overnight at 60° C. to give 5.14 g. of cortisone acetate (yield 51.4%). Paper chromatographic analysis showed that the product contained only a small percentage (1–5%) of U.V. absorbing impurities.

The above experiment (Example 1) was repeated exactly except that the addition of the manganous nitrate was omitted to give 2.75 g. of product. Paper chromatographic analysis showed that the product thus obtained contained only 15 to 25% of cortisone acetate.

*Example 2.—Cortisone Acetate*

To a solution of 200 g. of $11\beta,17\alpha,20\alpha,21$-tetrahydroxy-4-pregnen-3-one 21-acetate in 1.8 liters of glacial acetic acid was added 200 ml. of deionized water and 400 ml. of a 50% aqueous solution of manganous nitrate (500 g./liter). The solution was then cooled to about 15° C. by external cooling. A cold solution of 213.8 g. of chromium trioxide in 608 ml. of deionized water was then added keeping the temperature at or below 30° C. The resulting solution was then treated with 130 ml. of concentrated sulfuric acid and the temperature was maintained at about 30° C. with external cooling for 8 minutes. Deionized water (8 liters) was then added to the reaction mixture over a period of about 10 minutes. The slurry thus obtained was cooled to 10° C., the solids collected on a filter, washed with deionized water and dried at 90–100° C. to give 105 g. (52.5% yield) of cortisone acetate. Paper chromatographic analysis indicated a purity of about 95% cortisone acetate. Recrystallization from acetone-water gave 86.10 g. of cortisone acetate (overall process yield 43%) melting at 234–236° C., $[\alpha]_D$ +209° (dioxane).

*Example 3.—Cortisone Acetate*

A mixture was prepared consisting of 90 ml. of glacial acetic acid, 10 ml. of deionized water, 5.0 g. of crystalline manganous chloride ($MnCl_2 \cdot 4H_2O$), and 50 ml. of chromium trioxide solution (prepared by adding 23 ml. of concentrated sulfuric acid to a solution of 26.72 g. of chromium trioxide in 76 ml. of deionized water). An additional 5 ml. of deionized water was then added to completely dissolve the manganous chloride. $11\beta,17\alpha,20\alpha,21$-tetrahydroxy-4-pregnen-3-one 21-acetate (10 g.) was then added slowly over a period of about 7 minutes; the temperature of the solution rose from 28.5° C. to 40° C. and was maintained at 40° C. by external cooling. The temperature was maintained at about 40° C. for 8 minutes following the addition of the steroid. Deionized water (250 ml.) was then added slowly to the reaction mixture over a period of about 3 minutes (temperature dropped to 26° C.); an additional 150 ml. of deionized water was then added over a period of about 4 minutes. The slurry thus obtained was cooled to about 10° C., collected on a filter, washed well with about 500 ml. of water and dried in a vacuum oven at 50° C. to give 4.7985 g. (48.0% yield) of cortisone acetate. Paper chromatographic analysis showed that the product contained only a small percentage (1–5%) of U.V. absorbing impurities.

The cortisone acetate thus obtained was dissolved in 110 ml. of acetone, filtered, concentrated to 50 ml. by evaporation on a steam bath (crystallization occurred at about 75 ml.), cooled to room temperature and refrigerated for about 2 hours. The crystals thus obtained were collected on a filter, washed with 2 portions of cold acetone and dried in a vacuum oven at 50° C. to give 3.76 g. (overall yield 37.6%) of cortisone acetate, melting at 240–243° C.; ε=15,200; [α]$_D$ +213° (dioxane).

*Analysis.*—Calcd. for $C_{23}H_{30}O_6$: C, 68.63; H, 7.51. Found: C, 68.38; H, 7.73.

Example 4.—Cortisone Acetate

To a mixture of 10 g. of 11β,17α,20α,21-tetrahydroxy-4-pregnen-3-one 21-acetate, 95 ml. of glacial acetic acid, 10 ml. of deionized water, and 15 g. of cerous nitrate $[Ce(NO_3)_3 \cdot 6H_2O]$ was added 40 ml. of chromium trioxide solution (prepared as described in Example 3, above) slowly with stirring over a period of about 10 minutes. The temperature of the reaction mixture increased from 25° C. to 40.5° C. during the addition of the oxidizing solution and was maintained at about 40° C. by external cooling. Following the addition of the chromium trioxide solution, the temperature was maintained at 40° C. for an additional period of about 4 minutes. Deionized water (400 ml.) was then added slowly over a period of about 13 minutes. The slurry, thus obtained, was cooled to about 10° C., collected on a filter, washed with about 600 ml. of deionized water and dried to give 3.4 g. (34.0% yield) of cortisone acetate. Paper chromatographic analysis showed the product to contain about 2% of U.V. absorbing impurities.

Example 5.—Cortisone Acetate

To one part (the parts referred to in this example are by weight) of 11β,17α,20α,21-tetrahydroxy-4-pregnen-3-one 21-acetate was added 9.36 parts of glacial acetic acid, 1 part of water and 1 part of manganous nitrate. The manganous nitrate was added as a 50% aqueous solution, i.e., 500 gr. $Mn(NO_3)_2$ per liter. The mixture was cooled to 15° C. A solution of 1.07 parts of chromium trioxide in 3.04 parts of water (cooled to 15° C.) was then added. The temperature rose to 27–30° C. Cooling was continued and when the temperature again reached 15° C., 1.19 parts of concentrated sulfuric acid was added. The temperature increased to 27–30° C. and remained there for a period of about 5 minutes. Water (21.3 parts) was then added. The mixture was cooled to 15–18° C. and kept at this temperature for a period of about 15 minutes. The precipitated solids thus obtained, were collected on a filter, washed with water and dried to give (0.44 part (44.0% yield)) of cortisone acetate. Papergram analysis showed the product to be cortisone acetate containing 3 to 6% of U.V. absorbing impurities. Recrystallization from acetone-water gave 36 parts of cortisone acetate (overall yield 36%) melting at 238–246° C.; [α]$_D$ +214° (dioxane). The product thus obtained passed U.S.P. specifications.

Example 6.—6α-Methylcortisone Acetate

A mixture is prepared consisting of 10 g. of 6α-methyl 11β,17α,20α,21-tetrahydroxy-4-pregnen-3-one 21-acetate, 90 ml. of glacial acetic acid, 10 ml. of water and 20 ml. of a 50% aqueous solution of manganous nitrate (500 g. manganous nitrate/liter). The temperature of the mixture is fixed at about 10° C. and to it is added a solution of 10.688 gm. of chromium trioxide and 30.4 ml. of deionized water. The temperature is kept below 30° C. by external cooling during the addition. The reaction mixture is again cooled to about 10° C. and 6 ml. of concentrated sulfuric acid is added. The system is maintained at about 30° C. by external cooling for a period of about 8 minutes following the acid addition and then about 400 ml. of deionized water is added over a period of about 10 minutes. The slurry thus obtained is cooled to 10° C., filtered, washed clean of color with deionized water and dried overnight at about 60° C. to give 6α-methylcortisone acetate, a light colored crystalline solid of high purity.

Example 7.—6α-Fluorocortisone Acetate

A mixture is prepared consisting of 10 g. of 6α-fluoro-11β,17α,20α,21-tetrahydroxy 4-pregnen-3-one 21-acetate, 90 ml. of glacial acetic acid, 10 ml. of water and 20 ml. of a 50% aqueous solution of manganous nitrate (500 g. manganous nitrate/liter). The temperature of the mixture is then fixed at about 10° C. and to it is added a solution of 10.688 gm. of chromium trioxide and 30.4 ml. deionized water keeping the temperature below 30° C. by external cooling. The reaction mixture is again cooled to about 10° C. and 6 ml. of concentrated sulfuric acid is added. The system is maintained at about 30° C. by external cooling for a period of about 8 minutes following the acid addition and then about 400 ml. of deionized water is added over a period of about 10 minutes. The slurry thus obtained is cooled to 10° C., filtered, washed clean of color with deionized water and dried overnight at about 60° C. to give 6α-fluoro-cortisone acetate, a light colored crystalline solid of high purity.

Example 8.—Prednisone Acetate

Glacial acetic acid (10 liters) was added to a reactor and cooling was begun. Next, 2 kg. of 11β,17α,20α21-tetrahydroxy-1,4-pregnadien-3-one 21-acetate was added, followed by 3.5 liters of glacial acetic acid, 2 liters of deionized water and 2 liters of 50% aqueous manganous nitrate solution (500 g./liter). When the temperature of the mixture reached 10° C., a previously prepared solution of 1.737 kg. of chromium trioxide in 6.08 liters of deionized water was added causing an increase in the temperature. Cooling of the mixture was maintained and when the temperature again reached 10° C., 1.9 liters of concentrated sulfuric acid was added. The temperature of the reaction mixture increased to about 35° C. on addition of the acid and was then maintained at 30–35° C. for about 8 minutes after which 20 gallons of deionized water was added at the rate of 2 gallons per minute with external cooling. The slurry thus obtained was then cooled to 10° C. and solid product collected on a filter. The collected solids were washed with several gallons of deionized water and dried at 90–100° C., to give 1.18 kg. (59.0% yield) of prednisone acetate. Paper chromatographic analysis showed less than 6% of U.V. absorbing impurities in the prednisone acetate thus obtained.

Example 9.—Prednisone Acetate

To 1 part (the parts referred to in this example are by weight) of 11β,17α,20α,21-tetrahydroxy-1,4-pregnadien-3-one 21-acetate was added 1 part of water, 7.08 parts of acetic acid and one-half part of manganous nitrate. The manganous nitrate was added as a 50% aqueous solution, i.e., 500 g. $Mn(NO_3)_2$ per liter. The mixture was cooled to 15° C. A solution of 0.87 parts of chromium trioxide in 3.05 parts of water was then added causing an increase in temperature to 27–30° C. The reaction mixture was again cooled to 15° C. and 1.55 parts of concentrated sulfuric acid was added. The temperature again increased to 27–30° C. and was kept at 27–30° C. for a period of about 5 minutes. Water (40 parts) was then added and the mixture was stirred for a period of about 15 minutes. The precipitated solids thus obtained were collected on a filter, washed with water and dried to give 47.5 parts (47.5% yield) of prednisone acetate. Paper chromatographic analysis showed the product to be prednisone acetate containing 4 to 8% of U.V. absorbing impurities. Hydrolysis followed by recrystallization from acetone-water gave prednisone melting at 222–235° C., [α]$_D$ +170 to 172° C.

Example 10.—6α-Methylprednisone Acetate

Ten liters of glacial acetic acid is added to a reactor with cooling, followed by 2 kg. 6α-methyl-11β,17α,20α,21-tetrahydroxy-1,4-pregnadien-3-one 21-acetate, 3.5 liters of glacial acetic acid, 2 liters of deionized water and 2 liters of 50% aqueous manganous nitrate solution. When the temperature of the mixture reaches 10° C., a previously prepared solution of 1.737 kg. of chromium trioxide in 6.08 liters of deionized water is added. Cooling of the mixture is continued and when the temperature again reaches 10° C., 1.9 liters of concentrated sulfuric acid is added causing an increase in temperature to about 35° C. The temperature is maintained at about 30–35° C. for a period of about 8 minutes after which 20 gallons of deionized water is added at the rate of about 2 gallons per minute with external cooling. The slurry thus obtained is then cooled to about 10° C. and solid product is collected on a filter. The collected solids are washed with several gallons of deionized water and dried to give 6α-methylprednisone acetate, a light colored crystalline solid of high purity.

*Example 11.—6α-Fluoroprednisone Acetate*

Ten liters of glacial acetic acid is added to a reactor with cooling, followed by 2 kg. 6α-fluoro-11β,17α,20α,21-tetrahydroxy-1,4-pregnadien-3-one 21-acetate, 3.5 liters of glacial acetic acid, 2 liters of deionized water and 2 liters of 50% aqueous manganous nitrate solution. When the temperature of the mixture reaches 10° C., a previously prepared solution of 1.737 kg. of chromium trioxide in 6.08 liters of deionized water is added. Cooling of the mixture is continued and when the temperature again reaches 10° C., 1.9 liters of concentrated sulfuric acid is added causing an increase in temperature to about 35° C. The temperature is maintained at about 30–35° C. for a period of about 8 minutes after which 20 gallons of deionized water is added at the rate of about 2 gallons per minute with external cooling. The slurry thus obtained is then cooled to about 10° C. and solid product is collected on a filter. The collected solids are washed with several gallons of cold deionized water and dried to give 6α-fluorocortisone acetate, a light-colored crystalline solid of high purity.

*Example 12.—11-Ketoprogesterone*

To an agitated solution of 10 g. of 11α-hydroxyprogesterone and 0.4 g. of manganous sulfate, monohydrate, in 90 ml. of acetic acid and 50 ml. of water was added 13 ml. of oxidizing agent (consisting of 2.73 ml. of sulfuric acid, 3.17 g. of chromium trioxide and 9.14 ml. of deionized water) dropwise over a period of about 6 minutes. The temperature was maintained at about 30° C. After an additional period of about 4 minutes of reaction time, 350 ml. of water was added over a period of about 15 minutes. The precipitated crystals, thus obtained, were collected on a filter, washed with water and dried to give a 94.8% yield of 11-ketoprogesterone melting 171.5–174° C.; $[\alpha]_D$ +272 (chloroform); paper chromatographic analysis showed a trace of starting material in the final product.

*Example 13.—11-Ketoprogesterone*

To a solution of 10 g. of 11α-hydroxyprogesterone and 20 g. of 50% aqueous manganous nitrate in 90 ml. of acetic acid and 40 ml. of water, was added 13 ml. of chromic acid oxidizing agent (prepared in Example 12 above) dropwise over a period of about 6 minutes with agitation. The temperature was maintained at about 30° C. After an additional period of about 4 minutes of reaction time, 350 ml. of water was added over a period of about 15 minutes. The precipitated crystals, thus obtained, were collected on a filter, washed with water and dried to give a 93.8% yield of 11-ketoprogesterone melting at 172–174.5° C.; $[\alpha]_D$ +271 (chloroform); paper chromatographic analysis showed no impurities in the final product.

The above experiment (Examples 12 and 13) was repeated exactly except that the manganous salt was omitted giving an 88.4% yield of 11-ketoprogesterone melting at 169.5–172° C.; $[\alpha]_D$ +272; paper chromatographic analysis showed 1–3% of starting material and 2–6% of more polar impurities in the final product.

*Example 14.—11-Ketoprogesterone*

To an agitated solution of 200 parts (the parts referred to in this example are by weight) of 11α-hydroxyprogesterone and eight parts of manganous sulfate, monohydrate, in 940 parts of acetic acid and 504 parts of water was added an oxidation mixture made up of 63.5 parts of chromium trioxide, 100.5 parts of sulfuric acid and 180 parts of water, over a period of 30 to 40 minutes, keeping the temperature between 20 and 30° C. by external cooling. After the oxidizing mixture was added, the reaction was allowed to proceed for an additional period of about 4 minutes and then a mixture of 710 parts of 50% aqueous sodium hydroxide solution, 360 parts of ice and 1260 parts of water was added over a period of about 40 minutes keeping the temperature between 20 and 25° C. After an additional period of about 30 minutes of agitation, the precipitated solid thus obtained, was collected on a filter and washed with 3000 parts of water and dried at 75 to 85° C. for about 16 hours to give 194 parts (97.6% yield) of 11-ketoprogesterone melting at 171–174° C.; $[\alpha]_D$ +274° (chloroform). Papergram analysis showed the product to be 11-ketoprogesterone containing less than 2% impurities.

*Example 15.—Cortisone Acetate*

To an agitated solution of 10 g. of hydrocortisone acetate and 10 g. of manganous sulfate, monohydrate, in 45 ml. of acetic acid and 25 ml. of water was added 12 ml. of chromic acid oxidizing agent (prepared as in Example 12, above) dropwise over a period of about 5 minutes. The temperature was maintained at about 40° C. After an additional period of about 5 minutes of reaction time, 175 ml. of water was added over a period of about 10 minutes. The precipitated crystals thus obtained, were collected on a filter, washed with cold water and dried to give a 95.7% yield of cortisone acetate melting at 229.5–234° C.; $[\alpha]_D$ +211° (dioxane).

*Example 16.—Prednisone Acetate*

To an agitated solution of 10 g. of prednisolone acetate and 20 g. of manganous sulfate, monohydrate, in 90 ml. of acetic acid and 50 ml. of water was added 12 ml. of chromic acid reagent (prepared as in Example 12, above) dropwise over a period of about 10 minutes. The temperature was maintained at about 25° C. After an additional period of about 5 minutes of reaction time, 400 ml. of water was added over a period of about 15 minutes. The precipitated crystals thus obtained were collected on a filter, washed with cold water and dried to give a 95.0% yield of prednisone acetate melting at 225–237° C.; $[\alpha]_D$ +183° (dioxane).

*Example 17.—5α-Hydroxy-6β-Methyl-Pregnane-3,11,20-Trione*

To an agitated solution of 10 g. of 5α,11α-dihydroxy-6β-methyl-pregnane-3,20-dione and 2.0 g. of manganous sulfate, monohydrate, in 75 ml. of acetone and 20 ml. of water was added 12 ml. of chromic acid oxidizing agent (prepared in Example 12, above) dropwise over a period of about 8 minutes. The temperature was maintained at about 30° C. After an additional period of about 10 minutes of reaction time, 55 ml. of water was added over a period of about 5 minutes. The precipitated crystals, thus obtained, were collected on a filter, washed with cold water and dried to give 97.5% yield of 5α-hydroxy-6β-methylpregnane-3,11,20-trione melting at 230–231.5° C.; $[\alpha]_D$ +84° (chloroform).

Example 18.—5α-Hydroxy-6β-Fluoropregnane-3,11,20-Trione

To an agitated mixture of 10 g. of 5α,11α-dihydroxy-6β-fluoropregnane-3,20-dione and 2.0 g. of manganous sulfate, monohydrate, in 75 ml. of acetone and 20 ml. of water was added 12 ml. of chromic acid oxidizing agent (prepared in Example 12, above) dropwise over a period of about 8 minutes keeping the temperature at about 30° C. After an additional period of about 10 minutes of reaction time, about 60 ml. of water was added over a period of about 5 minutes. The precipitated crystals, thus obtained, were collected on a filter, washed with cold water and dried to give 5α-hydroxy-6β-fluoropregnane-3,11,20-trione, a light colored crystalline solid of high purity.

We claim:

1. In the process of oxidizing the 11,20-dihydroxy groups of a compound of the formula:

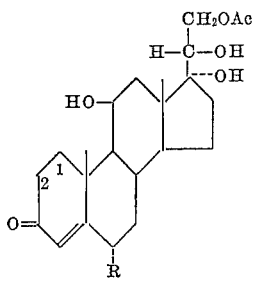

wherein Ac is the acyl radical of an organic carboxylic acid, R is selected from the group consisting of hydrogen, methyl, bromine, chlorine and fluorine, and the 1,2-carbon atom linkage is selected from the linkages consisting of single bond and double bond linkages, with chromic acid to produce the corresponding 11,20-diketo compound of the formula:

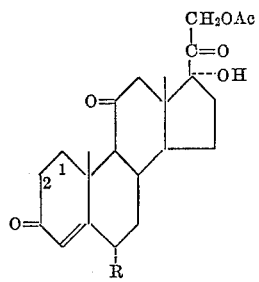

wherein Ac, R and the 1,2 carbon atom linkage are defined as above, the improvement which comprises carrying out the oxidation in the presence of ions selected from the group consisting of manganous ions and cerous ions.

2. The process which comprises oxidizing the 11,20-dihydroxy groups of a compound of the formula:

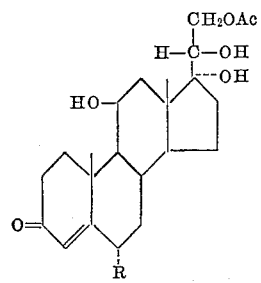

wherein Ac is the acyl radical of an organic carboxylic acid and R is selected from the group consisting of hydrogen, methyl, bromine, chlorine and fluorine, with chromic acid in the presence of ions selected from the group consisting of manganous ions and cerous ions, said ions being present within the range of from about 0.6 mole to about 3.0 moles per mole of starting steroid, to produce the corresponding 11,20-diketo compound of the formula:

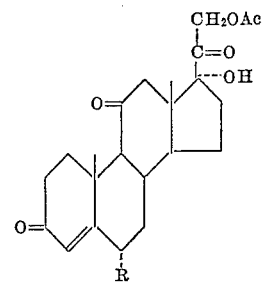

wherein Ac and R are defined as above.

3. The process which comprises oxidizing the 11,20-dihydroxy groups of a compound of the formula:

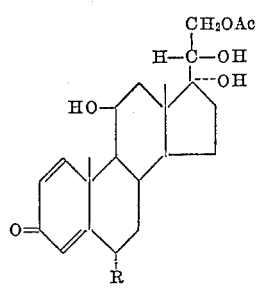

wherein Ac is the acyl radical of an organic carboxylic acid and R is selected from the group consisting of hydrogen, methyl, bromine, chlorine and fluorine, with chromic acid in the presence of ions selected from the group consisting of manganous ions and cerous ions, said ions being present within the range of from about 0.006 mole to 4.0 moles per mole of starting steroid, to produce the corresponding 11,20-diketo compound of the formula:

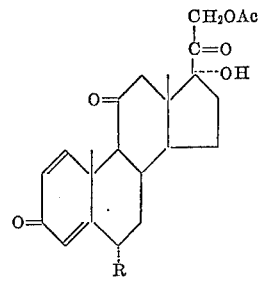

wherein Ac and R are defined as above.

4. The process which comprises oxidizing 11β,17α,20α,21-tetrahydroxy-4-pregnen-3-one 21-acetate with chromic acid in the presence of manganous ions, said ions being present within the range of from about 0.6 mole to about 3.0 moles per mole of starting steroid, to produce cortisone acetate.

5. The process which comprises oxidizing 11β,17α,20α,21-tetrahydroxy-4-pregnen-3-one 21-acetate with chromic acid in the presence of cerous ions, said ions being present within the range of from about 0.06 mole to about 3.0 moles per mole of starting steroid, to produce cortisone acetate.

6. The process which comprises oxidizing 6α-methyl-11β,17α,20α,21-tetrahydroxy-4-pregnen-3-one 21-acetate with chromic acid in the presence of manganous ions, said ions being present within the range of from about 0.6 mole to about 3.0 moles per mole of starting steroid, to produce 6α-methylcortisone acetate.

7. The process which comprises oxidizing 6α-fluoro-11β,17α,20α,21-tetrahydroxy-4-pregnen-3-one 21-acetate with chromic acid in the presence of manganous ions, said ions being present within the range of from 0.6 mole to about 3.0 moles per mole of starting steroid, to produce 6α-methylcortisone acetate.

8. The process which comprises oxidizing 11β,17α,-20α,21-tetrahydroxy-1,4-pregnadien-3-one 21-acetate with chromic acid in the presence of manganous ions, said ions being present within the range of from about 0.06 mole to about 4.0 moles per mole of starting steroid, to produce prednisone acetate.

9. The process which comprises oxidizing 6α-methyl-11β,17α,20α,21-tetrahydroxy-1,4-pregnadien-3-one 21-acetate with chromic acid in the presence of manganous ions, said ions being present within the range of from about 0.06 mole to about 4.0 moles per mole of starting steroid, to produce 6α-methylprednisone acetate.

10. The process which comprises oxidizing 6α-fluoro-11β,17α,20α,21-tetrahydroxy-1,4-pregnadien-3-one 21-acetate with chromic acid in the presence of manganous ions, said ions being present within the range of from about 0.06 mole to about 4.0 moles per mole of starting steroid, to produce 6α-fluoro-prednisone acetate.

11. In the process of oxidizing the 11-hydroxy group of a compound of the formula:

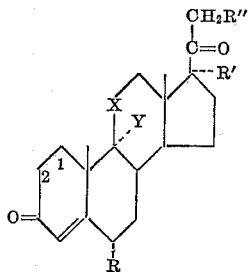

wherein R is selected from the group consisting of hydrogen, methyl, bromine, chlorine and fluorine, R' is selected from the group consisting of hydrogen and hydroxy, R'' is selected from the group consisting of hydrogen and OAc, in which Ac is the acyl radical of an organic carboxylic acid, X is selected from the group consisting of the α-hydroxymethylene radical and the β-hydroxymethylene radical, Y is selected from the group consisting of hydrogen, bromine, chlorine, and fluorine, and the 1,2-carbon atom linkage is selected from the linkages consisting of single bond and double bond linkages, with chromic acid to produce the corresponding 11-keto compound of the formula:

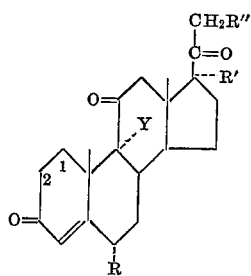

wherein R, R', R'', Y and the 1,2-carbon atom linkage are defined as above, the improvement which comprises carrying out the oxidation in the presence of ions selected from the group consisting of manganous and cerous ions.

12. The process which comprises oxidizing the 11-hydroxy group of a compound of the formula:

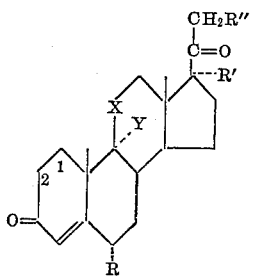

wherein R is selected from the group consisting of hydrogen, methyl, bromine, chlorine and fluorine, R' is selected from the group consisting of hydrogen and hydroxy, R'' is selected from the group consisting of hydrogen and OAc, in which Ac is the acyl radical of an organic carboxylic acid, X is selected from the group consisting of the α-hydroxymethylene radical and the β-hydroxymethylene radical, Y is selected from the group consisting of hydrogen, bromine, chlorine and fluorine, and the 1,2-carbon atom linkage is selected from the linkages consisting of single bond and double bond linkages, with chromic acid in the presence of ions selected from the group consisting of manganous ions and cerous ions, said ions being present within the range of from about 0.1 millimole to about 2 moles per mole of starting steroid, to produce the corresponding 11-keto compound of the formula:

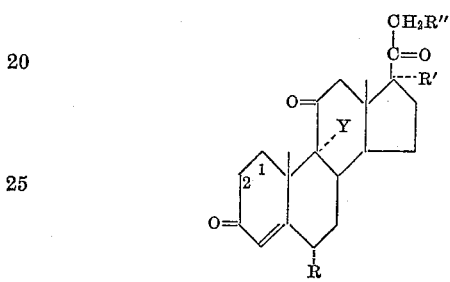

where R, R', R'', Y and 1,2-carbon atom linkage are defined as above.

13. The process which comprises oxidizing 11α-hydroxy-progesterone with chromic acid in the presence of manganous ions, said ions being present within the range of from about 15 millimoles to about 0.4 mole per mole of starting steroid, to produce 11-ketoprogesterone.

14. The process which comprises oxidizing hydrocortisone acetate with chromic acid in the presence of manganous ions, said ions being present within the range of from about 15 millimoles to about 0.4 mole per mole of starting steroid, to produce cortisone acetate.

15. The process which comprises oxidizing prednisolone acetate with chromic acid in the presence of manganous ions, said ions being present within the range of from about 15 millimoles to about 0.4 mole per mole of starting steroid, to produce prednisone acetate.

16. In the process of oxidizing the 11-hydroxy group of a compound of the formula:

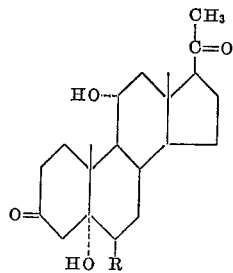

wherein R is selected from the group consisting of hydrogen, methyl, bromine, chlorine and fluorine with chromic acid to produce the corresponding 11-keto compound of the formula:

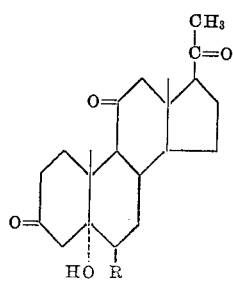

wherein R is defined as above, the improvement which comprises carrying out the oxidation in the presence of ions ions selected from the group consisting of manganous ions and cerous ions.

17. The process which comprises oxidizing the 11-hydroxy group of a compound of the formula:

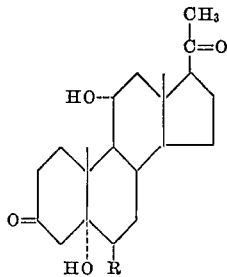

wherein R is selected from the group consisting of hydrogen, methyl, bromine, chlorine and fluorine, with chromic acid in the presence of ions selected from the group consisting of manganous and cerous ions, said ions being present within the range of about 0.1 millimole to 2 moles per mole of starting steroid, to produce the corresponding 11-keto compound of the formula:

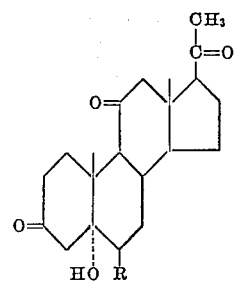

wherein R is defined as above.

18. The process which comprises oxidizing $5\alpha,11\alpha$-dihydroxy-$6\beta$-methylpregnane-3,20-dione with chromic acid in the presence of manganous ions, said ions being present within the range of from about 15 millimoles to about 0.4 mole per mole of starting steroid, to produce $5\alpha$-hydroxy-$6\beta$-methylpregnane-3,11,20-trione.

19. The process which comprises oxidizing $5\alpha,11\alpha$-dihydroxy-$6\beta$-fluoropregnane-3,20-dione with chromic acid in the presence of manganous ions, said ions being present within the range of from about 15 millimoles to about 0.4 mole per mole of starting steroid, to produce $5\alpha$-hydroxy-$6\beta$-fluoropregnane-3,11,20-trione.

No references cited.